US006487182B1

(12) United States Patent
Kitazato

(10) Patent No.: US 6,487,182 B1
(45) Date of Patent: Nov. 26, 2002

(54) INFORMATION REPEATER SYSTEM

(75) Inventor: Naohisa Kitazato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/187,657

(22) Filed: Nov. 6, 1998

(30) Foreign Application Priority Data

Nov. 10, 1997 (JP) ............................................ 9-307675
Nov. 13, 1997 (JP) ............................................ 9-312501

(51) Int. Cl.$^7$ ................................................ H04B 7/14
(52) U.S. Cl. ...................................... 370/315; 370/535
(58) Field of Search ................................ 370/315–319,
370/240, 250, 430, 486–489, 535–539,
274, 293, 302, 392, 468; 725/71, 74, 83,
138; 455/12.1

(56) References Cited

U.S. PATENT DOCUMENTS

| 4,287,593 | A | * | 9/1981 | Stover ........................ 370/507 |
| 5,534,926 | A | * | 7/1996 | Ohki et al. ............. 375/240.25 |
| 5,764,983 | A | | 6/1998 | Okamoto et al. |
| 6,047,162 | A | * | 4/2000 | Lazaris-Brunner et al. 455/12.1 |
| 6,111,896 | A | * | 8/2000 | Slattery et al. ............. 370/535 |
| 6,115,422 | A | * | 9/2000 | Anderson et al. ........... 370/392 |
| 6,195,368 | B1 | * | 2/2001 | Gratacap .................... 370/535 |
| 6,351,474 | B1 | * | 2/2002 | Robinett et al. ............ 370/468 |

FOREIGN PATENT DOCUMENTS

| GB | 2 315 649 | 2/1998 |
| JP | 8 88845 | 4/1996 |

OTHER PUBLICATIONS

Bungum O W: "Transmultiplexer, Transcontrol and Transscrambling of MPEG–2/DVB Signal" International Broadcasting Convention, Sep. 12, 1996, XP002040478.

DeFrance: "Switching MPEG–2" IEE Colloquium on Novel Techniques for Antenna Beam Control, GB, IEE, London, Jan. 16, 1995, pp. 7–1–7–3, XP002074511.

Cartwright C T: "Issues in Multiplex and Service Management in Digital Multichannel Broadcasting" International Broadcasting Convention, GB, London, Sep. 1997, pp. 308–313, XP000668937.

Lee et al: "Implementation of MPEG–2 TS Remultiplexer and Data Transport Unit for HDTV Satellite Broadcasting" IEEE Transactions of Consumer Electronics, US, IEEE Inc. New York, vol. 43, No. 3, Aug. 1, 1997 pp. 324–329, XP002084315 ISNN: 0098–3063.

* cited by examiner

Primary Examiner—Salvatore Cangialosi
(74) Attorney, Agent, or Firm—Frommer, Lawrence & Haug LLP; William S. Frommer

(57) ABSTRACT

To provide an information repeater system capable of selecting a desired broadcasting program with a simple construction, in the information repeater system for receiving a broadcasting wave formed by multiplexing plural broadcastings and distributing it to the corresponding channel of a specified broadcasting system. Data streams D25A, D25B, . . . D25N relayed by specified transponders are extracted from the broadcasting wave S1. Arbitrary packets D32A, D32B, . . . D32N are specified and extracted from the above data streams. Thus extracted packets are transmitted to the specified channel of the specified broadcasting system. Thereby, the desired channel can be transmitted to the desired channel of the specified broadcasting system from among the plural broadcastings multiplexed in the broadcasting wave.

19 Claims, 12 Drawing Sheets

INFORMATION REPEATER SYSTEM

BACKGROUND OF THE INVENTION

1. Field of the Invention

The present invention relates to an information repeater system, and is suitably applied, for example, to an information repeater system for receiving a digital satellite broadcasting wave formed by multiplexing the programs of plural channels, extracting an arbitrary channel, and then distributing it to the. desired channel of a cable broadcasting system.

2. Description of the Related Art

Heretofore, there has been a compression coding method called MPEG2 (moving picture experts group phase 2) as a method for reducing the amount of information such as video and audio or the like. A DVB (digital video broadcasting) system has been provided as a digital broadcasting system for compressively coding video and audio broadcasting data using the above compression coding method and broadcasting programs using terrestrial waves or satellite waves. In this broadcasting system, broadcasting data compressively coded by the MPEG2 system is packetized in each prescribed block, and thus obtained packet train is transmitted (hereinafter, the packet is referred to as TS (transport stream) packet and a data stream formed of a train of the above TS packet is referred to as transport stream). Furthermore, in the digital broadcasting system, thus packetized broadcasting data of plural program channels are multiplexed. Thereby, plural program channels can be broadcasted by a single line.

In this connection, a program channel is one of broadcasting services. One formed by multiplexing plural program channels is referred to as single transmission channel. The above single transmission channel is relayed by the corresponding single transponder of a communication satellite. Plural transponders are provided in the communication satellite to relay and transmit the broadcasting data of plural transmission channels to the earth.

By the way, in a cable television system for distributing information such as television programs or the like by a cable (hereinafter, this is referred to as CATV (cable television)), a repeater system which receives a digital multiplex satellite broadcasting wave distributed via a communication satellite and redistributes this as a cable television program broadcasting is considered.

As one of methods for receiving and distributing a digital multiplex satellite broadcasting wave to a CATV, a method for demodulating a signal relayed by one of the single transponders of a communication satellite to generate a transport stream, and then modulating the above transport stream correspondingly to the CATV, and transmitting this to a single CATV channel is considered. In the case of this method, as shown in FIG. 1, all program channels included in the transmission channel relayed by the specified transponder are distributed to the single CATV channel. For example, in the case where a transponder Tr1 of satellite broadcasting corresponds to a CATV channel Ch1 of CATV, program channels C1, C2 and C3 which have been multiplexed in a transmission channel to be distributed by relayed by the transponder Tr1 are multiplexed into the CATV channel Ch1.

In the case where a digital multiplex satellite broadcasting is redistributed to a CATV by the above method, however, since a transmission channel to be relayed to a single CATV channel by a single transponder is distributed, it is difficult to selectively distribute a program channel to be relayed by another transponder to the above CATV channel. Thus, a desired program channel cannot be distributed to a single CATV channel from among plural transmission channels, and it causes a problem in usability.

The present invention has been done considering the above point and is proposing an information repeater system capable of selecting and distributing a desired broadcasting program with a simple construction.

SUMMARY OF THE INVENTION

In view of the foregoing, an object of this invention is to provide an information repeater system for receiving a broadcasting wave formed by multiplexing plural broadcastings and distributing it to the corresponding channel of a specified broadcasting system, in which a data stream relayed by a specified transponder is extracted from the broadcasting wave, an arbitrary packet is specified and extracted from the above data stream, and the above extracted packet is transmitted to the specified channel of the specified broadcasting system. Thereby, a desired channel can be extracted and transmitted to the desired channel of the specified broadcasting system from among the plural broadcastings multiplexed in the broadcasting wave.

The data stream relayed by the specified transponder is extracted from the broadcasting wave, and thus extracted data stream is assigned to a specified packet extracting means. In the above packet extracting means, the arbitrary packet is specified and extracted from the data stream, and thus-extracted packet is transmitted to the specified channel of the specified broadcasting system. Thereby, the desired channel can be extracted from the plural broadcastings multiplexed in the broadcasting wave and can be transmitted to the desired channel of the specified broadcasting system.

Furthermore, since a single packet extracting means is made to correspond to each broadcasting program to be distributed to the specified broadcasting system, the number of the above packet extracting means can be limited to the number of broadcastings to be distributed. Thus, the constitution of the information repeater system can be simplified.

This repeater system has a system information update detecting means for detecting whether or not the contents of system information to make the desired program channel correspond to a packet corresponding to said desired program channel has been updated. Thereby, if it is detected that the contents of said system information has been updated by said update detecting means, the system information is replaced by new system information in a system information memory means.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of the present invention will be described with reference to the accompanying drawings:

(1) Satellite Broadcasting Distribution CATV System

Figure 2:
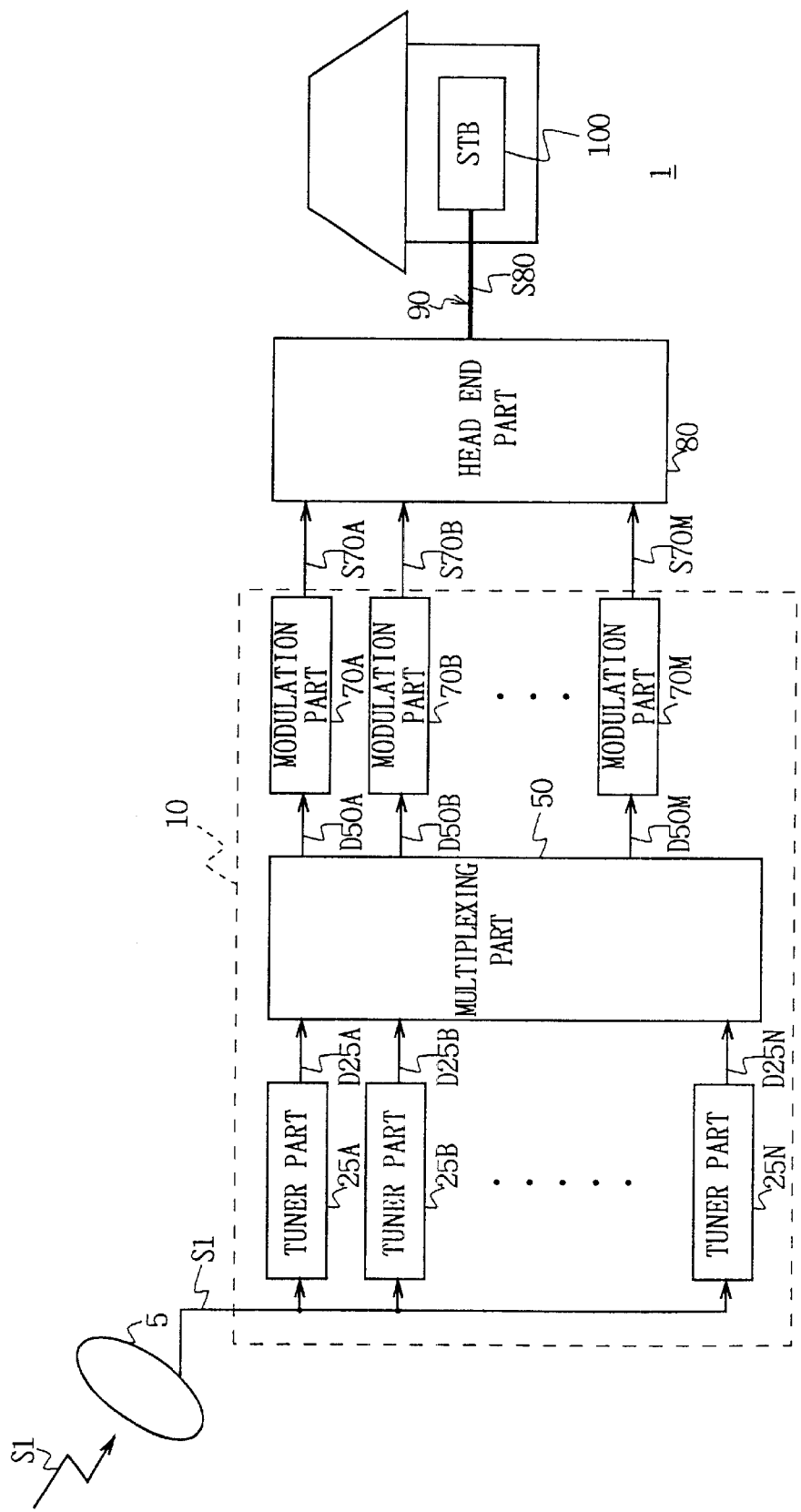
FIG. 2 is a block diagram showing a satellite broadcasting distribution CATV system according to the present invention.

Referring to FIG. 2, 1 generally shows a satellite broadcasting distribution CATV system according to a first embodiment. A satellite broadcasting signal S1 relayed by a communication satellite (not shown) is received by an antenna 5 and supplied to a receiving distribution device 10 as an information repeater system. In the receiving distribution device 10, the satellite broadcasting signal S1 is supplied to N pieces of tuner parts 25A to 25N having the same construction. Here, the number of tuner parts 25A to 25N, N is the same as the number of transponders had in the communication satellite.

The tuner parts 25A to 25N perform demodulation and error correction synchronizing with each corresponding transponder of the satellite broadcasting signal S1, and extract the transport streams D25A to D25N of the transmission channels relayed by each transponder and supplying them to a multiplexing part 50. These transport streams D25A to D25N are formed by multiplexing plural program channels, respectively. The multiplexing part 50 temporary separates the transport streams D25A to D25N into TS packets forming each of them, and then remultiplexes the TS packets of plural program channels to be assigned to a single CATV channel among the above plural TS packets, and distributing it to the corresponding CATV channel.

In the first embodiment, M pieces of CATV channels are provided. Program channels obtained via N pieces of transponders are arbitrary combined and distributed to each CATV channel. Transport streams D50A to D50M thus obtained by the remultiplexing in the multiplexing part 50 are distributed to each corresponding CATV channel and supplied to modulation parts 70A to 70M provided in each CATV channel.

Figure 3:
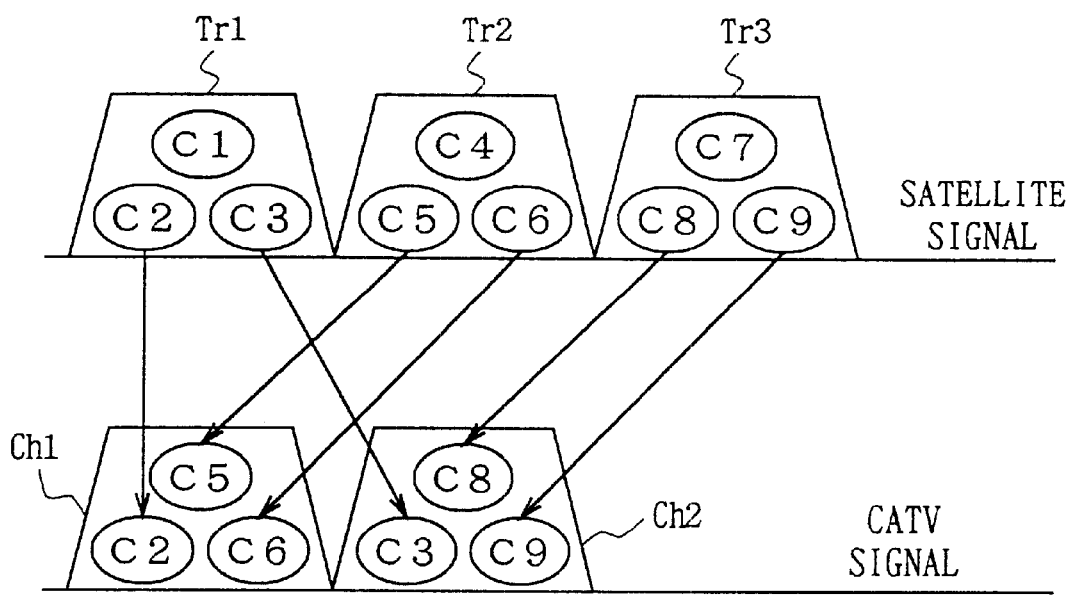
FIG. 3 is a schematic diagram showing rearrangement of channels.

FIG. 3 shows an example of the rearrangement of channels at the time of remultiplexing in the multiplexing part 50, that is, when each of the program channels C1 to C9 of a satellite broadcasting is redistributed to a CATV. Three program channels C1, C2 and C3 have multiplexed in a transmission channel to be relayed by a transponder Tr1 had in a communication satellite. Similarly, three program channels C4, C5 and C6 have multiplexed in a transmission channel to be relayed by a transponder Tr2, and three program channels C7, C8 and C9 have multiplexed in a transmission channel to be relayed by a transponder Tr3.

The receiving distribution device 10 performs remultiplexing by selecting and combining arbitrary channels among the nine program channels C1 to C9. For example, the program channels C2, C5 and C6 are remultiplexed into a first CATV channel Ch1, and the program channels C3, C8 and C9 are remultiplexed into a second CATV channel Ch2. Here, the program channels C1, C4 and C7 are not remultiplexed into a CATV channel and not distributed. As the above, the multiplexing part 50 selects the arbitrary program channels among the program channels multiplexed in the satellite broadcasting, and performs remultiplexing with arbitrary combinations.

In FIG. 2, the demodulation parts 70A to 70M of each CATV channel modulates the transport streams D50A to D50M according to a 64QAM (quadrature amplitude modulation) being one of CATV modulation systems, and supplies transmission signals S70A to S70M to a head end part 80. The head end part 80 performs frequency multiplexing on the transmission signals S70A to S70M, and transmits this to a CATV cable 90 as a transmission signal S80. The transmission signal S80 is subjected to demodulation, channel selection and decoding in a set top box (STB) 100 had by a CATV subscriber. The resultant signal is transmitted to a television receiver (not shown) to be displayed.

(2) Configuration of Receiving Distribution Device of First Embodiment

Figure 4:
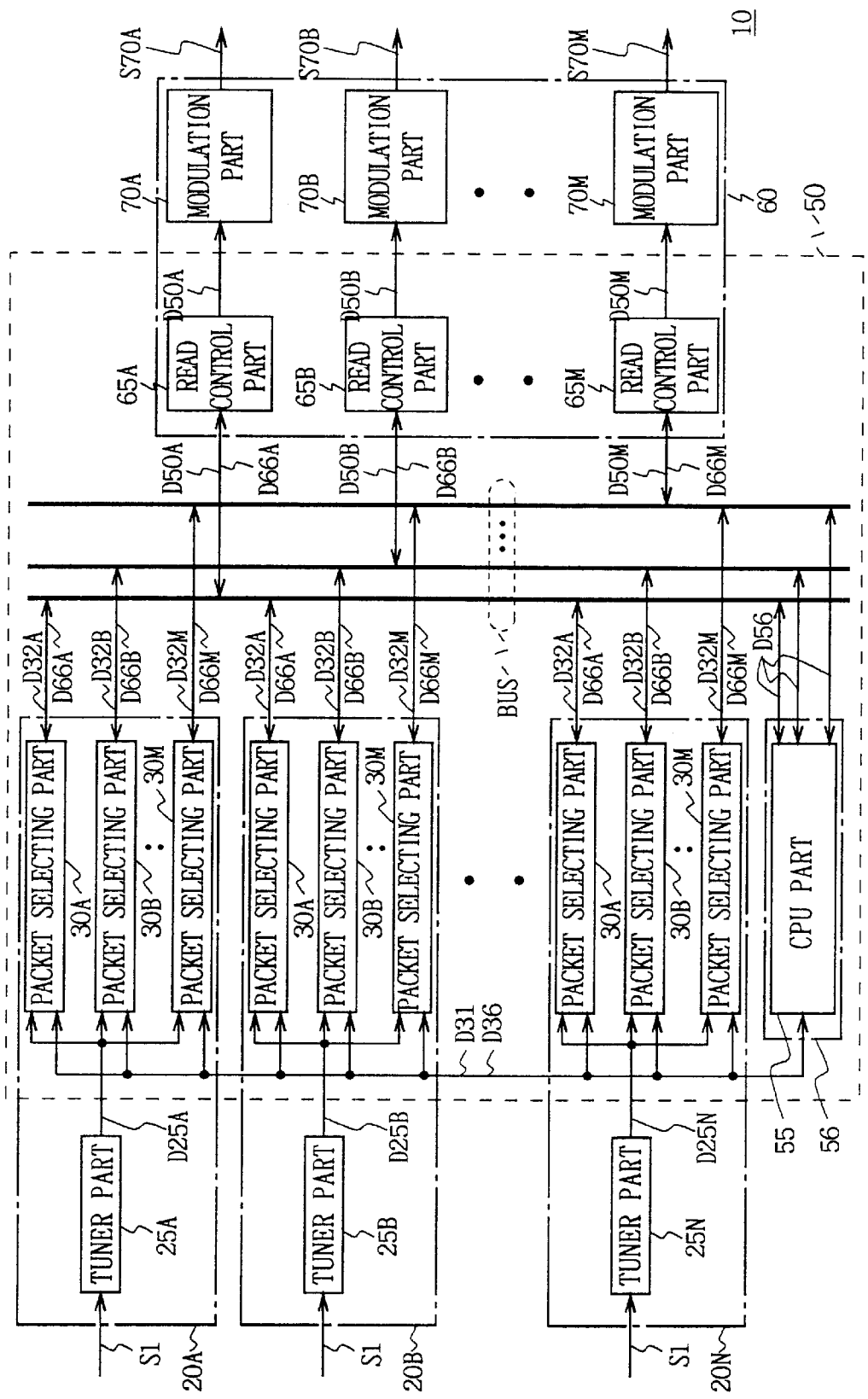
FIG. 4 is a block diagram showing a receiving distribution device according to the present invention.

FIG. 4 in which the same reference numerals are added to corresponding parts of FIG. 2 generally shows the receiving distribution device 10. In this device, receiving board parts 20A to 20N, a CPU board part 56 and a modulation board-part 60 are connected to an internal multiplex bus BUS. The N pieces of receiving board parts 20A to 20N of which the number is equal to the number of transponders have the same configuration respectively, and on each board the tuner parts 25A, 25B, . . . , 25N and packet selecting parts 30A to 30M of which the number is corresponding to the number of the CATV channels (M) are provided respectively. Similarly, also the CPU board part 56 and the modulation board part 60 form individual boards respectively. The modulation parts 70A to 70M of which the number is corresponding to the number of the CATV channels are provided in the modulation board part 60.

Figure 5:
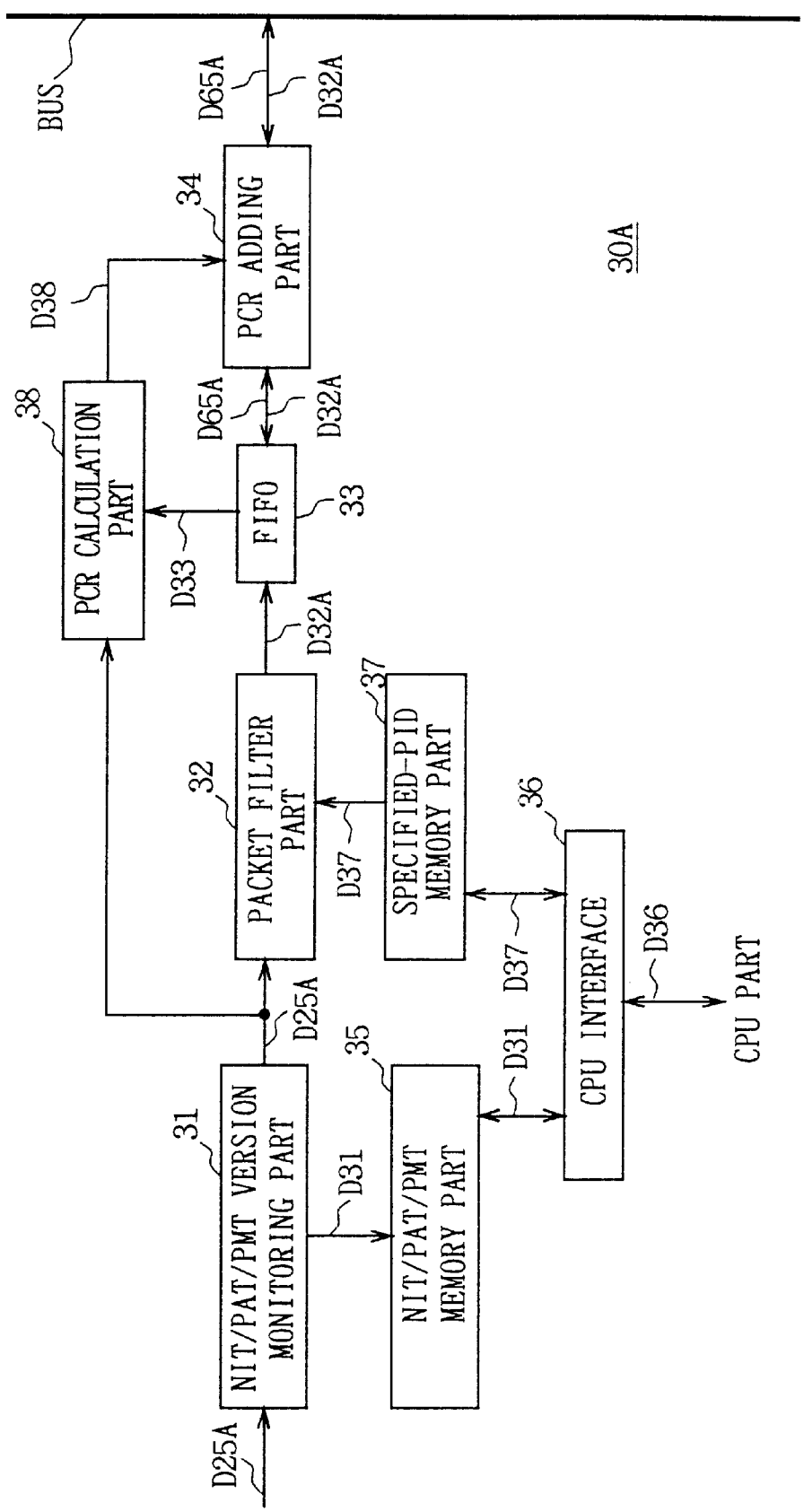
FIG. 5 is a block diagram showing a packet selecting part according to the present invention.

The tuner part 25A of the receiving board part 20A performs demodulation and error correction on the satellite broadcasting signal S1 received by the antenna 5 (FIG. 2), and transmits this to the M pieces of packet selecting parts 30A to 30M as the transport stream D25A. Here, the number of the packet selecting parts 30A to 30M, M is the same as the number of the CATV channels. FIG. 5 generally shows the packet selecting part 30A. The transport stream D25A is supplied to an NIT (network information table)/PAT (program association table)/PMT (program map table) version monitoring part 31.

Here, an NIT, a PAT and a PMT are system information in hierarchical structure defined by the MPEG2 system, and each of them is assigned to the predetermined position of a transport stream. The NIT is positioned at the top of the system information having the hierarchical structure, to which the frequency information of each transponder had in the communication satellite, the list of program channels and information on transponders for relaying a program channel for each program channel, or the like are assigned.

The PAT is a table to which the value of the packet identifier PID of the PMT (i.e., the position of PMT) is assigned. In this connection, the PMT is provided for each program channel in the transport stream, and it is a table to which the value data of the PID added to the TS packet of each program channel (i.e., the position of the TS packet of a program channel) is assigned.

For example, in a digital multiplex satellite broadcasting receiving system, when a user selects a desired program channel, the above receiving system first refers its NIT to discriminate a transponder for relaying the desired program channel, as well as tuning to the frequency of the above transponder. Thus, the transport stream of a transmission channel in which the program channel desired by the user has multiplexed is received.

Then the above receiving system refers the PAT assigned to the received transport stream to recognize the position of the PMT of the desired program channel (i.e., the PID of the PMT). Thus, the receiving system can refer the PMT of the program channel desired by the user. Therefore, the PID of each TS packet of the above program channel is recognized, and only TS packet forming the desired program channel can be selected from the transport stream in which plural program channels have multiplexed.

In the satellite broadcasting distribution CATV system 1 for redistributing a digital multiplex satellite broadcasting to a CATV, the NIT/PAT/PMT version monitoring part 31 shown in FIG. 5 extracts an NIT, PAT and PMT assigned to the transport stream D25A, and storing them in an NIT/PAT/PMT memory part 35. Therefore, the position of the TS packet of each program channel can be recognized by referring to the above NIT/PAT/PMT memory part 35.

A CPU part 55 (FIG. 4) presets program channels to be distributed to predetermined CATV channels. For example, with respect to a program channel to be distributed to a first CATV channel, the CPU part 55 reads the position of the TS packet of the program channel to be distributed to the first CATV channel (i.e., the PID of the above TS packet) from the NIT/PAT/PMT memory part 35 of the packet selecting part 30A shown in FIG. 5, that is corresponding to the first CATV channel, and storing this in a specified-PID memory part 37 as PID information D37.

A packet filter 32 fetches only a TS packet specified by the PID information D37 from the incoming transport stream D25A, and transmitting this to a following FIFO (first in, first out) buffer 33. Thus, only the TS packet of the program channel to be distributed to the first CATV channel is supplied to the above FIFO buffer 33 from the transport stream D25A relayed via the first transponder of the communication satellite.

In this connection, in the transport stream D25A, the same information is always repeatedly assigned as the NIT, PAT and PMT. As the case where the contents of broadcasting of the digital multiplex satellite broadcasting is changed, however, if the combination of a transponder and a program channel is changed, also information on the above NIT, PAT and PMT are updated. Here, since the NIT, PAT and PMT have version information, the version information is simultaneously updated if the contents of broadcasting is changed. That is, by monitoring the version information of the NIT, PAT and PMT, the update of the above NIT, PAT and PMT can be detected.

In the system (1) for redistributing a digital multiplex satellite broadcasting to a CATV, the NIT/PAT/PMT version monitoring part 31 shown in FIG. 5 always monitors the NIT, PAT and PMT assigned to the transport stream D25A, detects the NIT, PAT and PMT of the transport stream D25A inputted in the initial state, and stores them in the NIT/PAT/PMT memory part 35 as NIT/PAT/PMT data D31. At the same time, if the update of the version of the NIT, PAT and PMT is detected after the above initial state, the above NIT, PAT and PMT are stored for update in the NIT/PAT/PMT memory part 35 as the NIT/PAT/PMT data D31. Therefore, the latest NIT, PAT and PMT are always stored in the NIT/PAT/PMT memory part 35.

A CPU interface 36 always monitors the NIT/PAT/PMT memory part 35. If the update of the version of the NIT, PAT and PMT is detected by the CPU interface 36, this means that the assignment of the program channel of the digital multiplex satellite broadcasting or the like is changed, so that the above CPU interface 36 transmits version update information D36 to the CPU part 55.

If receiving the version update information D36, the CPU part 55 reads the latest NIT/PAT/PMT data D31 from the NIT/PAT/PMT memory part 35, and generates NIT/PAT/PMT data for CATV D56 (FIG. 4) corresponding to the channel structure of the CATV, based on the above NIT/PAT/PMT data D31, and repeatedly transmits this to the internal multiplex bus BUS.

Thus, the NIT/PAT/PMT data for CATV D56 can be obtained to always distribute a predetermined program channel to a CATV channel even if the program channel structure of the digital multiplex satellite broadcasting is changed.

The FIFO buffer 33 of the packet selecting part 30A of FIG. 5 reads a selected TS packet D32A written in the above FIFO buffer 33 according to a read command D66A that is to be transmitted from the read control part 65A of the modulation board part 60 shown in FIG. 4, and transmitting this to the bus BUS via a PCR (program clock reference) adding part 34.

A PCR is clock reference information in the MPEG2 system, and is a 42 [Bit] count value representing 24 hour counted by a 27 [MHz] system clock, recorded in the prescribed TS packet in a transport stream. In the MPEG2 system, the PCR is recorded to the above TS packet by a transmission device at a time point when the TS packet is generated. In a receiving device, the system clock of the above receiving device is reset to a value shown by the above PCR at a time point when the above TS packet arrives, so that the system clock of the transmission device and the system clock of the receiving device are synchronized.

In the satellite broadcasting distribution CATV system 1 according to the present invention, the receiving device corresponds to the STB 100 shown in FIG. 2. In the FIFO buffer 33, the selected TS packet D32A generates a stand-by time from write till read against the above FIFO buffer 33. The above stand-by time is not constant, however, it fluctuates according to the occupied amount of the TS packets D32A to D32M in the FIFO buffer 33 of each of the packet selecting parts 30A to 30M (FIG. 4), or the like. Owing to the fluctuation of this stand-by time, the fluctuation of the time from a time when the selected TS packet D32A is transmitted from the transmission device until arriving the STB 100 is generated. This time fluctuation is called jitter. If the above jitter is generated, the system clock of the transmission device and the system clock of the receiving device cannot be synchronized with the system clock of the STB 100. On this account, the PCR had in the selected TS packet data D32A is corrected according to the stand-by time of the above selected TS packet D32A in the FIFO buffer 33.

That is, a PCR calculation part 38 shown in FIG. 5 always monitors the FIFO buffer 33 to obtain the stand-by time from a time when the selected TS packet D32A is written in the above FIFO buffer 33 until read as stand-by time information D33. Then, the PCR calculation part 38 corrects the PCR value of the selected TS packet D32A obtained from the transport stream D25A according to the stand-by time information D33, and transmitting this to the PCR adding part 34 as a corrected PCR value D38. The PCR adding part 34 corrects the PCR of the selected TS packet D32A to a value shown by the corrected PCR value D38, and transmitting this to the bus BUS.

Thereby, in the first packet selecting part 30A (FIGS. 4 and 5) of the receiving board part 20A (FIG. 4) that receives a transmission channel relayed via the first transponder of the communication satellite (transport stream D25A) in the digital multiplex satellite broadcasting, only the TS packet of the program channel to be distributed to the first CATV channel is selected as the selected TS packet D32A, and transmitting this to the channel of the internal multiplex bus BUS that is corresponding to the first CATV channel.

The second to the M-th packet selecting parts 30B to 30M provided in the above receiving board part 20A respectively select the TS packets of the program channels to be distributed to the second CATV channel to the M-th CATV channel among the transmission channels relayed by the first transponder of the communication satellite, by the control of the CPU part 55, and transmitting this to the corresponding channel of the internal multiplex bus BUS.

The first receiving board part 20A selects the TS packet of the program channel to be distributed to each CATV channel previously specified by the CPU part 55 from among the plural program channels multiplexed in the transmission channel relayed by the first transponder of the communication satellite, respectively, and transmitting this to the corresponding channels of the internal multiplex bus BUS.

Similarly, the second to the N-th receiving board parts 20B to 20N respectively select each TS packet of the plural program channels multiplexed in the transmission channel relayed by the second to the N-th transponders of the communication satellite by each corresponding packet selecting part, and transmitting this to the corresponding channel of the internal multiplex bus BUS.

The bus BUS has plural channels corresponding to each CATV channel. For example, the selected TS packets D32A selectively and respectively outputted from the packet selecting part 30A corresponding to the first CATV channel of each of the receiving board parts 20A to 20N are supplied to a channel corresponding to the first CATV channel. And selected TS packets D32B selectively and respectively outputted from the packet selecting part 30B corresponding to the second CATV channel of each of the receiving board parts 20A to 20N are supplied to a channel corresponding to the second CATV channel.

As the above, each TS packet of the plural program channels to be distributed to each CATV channel separated from each transmission channel (selected TS packet) is assigned to the corresponding CATV channel of the internal multiplex bus BUS.

In FIG. 4, the modulation board part 60 has M pieces of read control parts 65A to 65M corresponding to the CATV channels. The above read control parts 65A to 65M respectively always monitor the FIFO buffer 33 of the corresponding packet selecting parts 30A to 30M (FIG. 5) via the internal multiplex bus BUS. Then, the read control parts 65A to 65M transmit read commands D66A to D66M to the above FIFO buffer 33 based on the occupied amount of the TS packets D32A to D32M in the FIFO buffer 33 in a prescribed order, respectively. The selected TS packets D32A to D32M in the FIFO buffer 33 are sequentially read out to the internal multiplex bus BUS to be multiplexed into each CATV channel.

As the above, in the plural program channels multiplexed in the first transmission channel relayed by the first transponder of the communication satellite, the TS packet of the program channel to be distributed to the first CATV channel is selected by the first packet selecting part 30A of the first receiving board part 20A, and distributed to the above first CATV channel by the read control part of the first CATV channel 65A.

In the plural program channels multiplexed in the second transmission channel that have relayed by the second transponder of the communication satellite, the TS packet of the program channel to be distributed to the first CATV channel is selected by the first packet selecting part 30A of the second receiving board part 20B, and distributed to the above first CATV channel by the read control part of the first CATV channel 65A.

In the plural program channels multiplexed in each transmission channel, the TS packet of the program channel to be distributed to the first CATV channel is selected by the first packet selecting part 30A that is corresponding to the first CATV channel provided in each of the receiving board parts 20A to 20N, read out by the read control part of the first CATV channel 65A, and multiplexed for CATV distribution.

Also in the second to the M-th CATV channels, similarly, in the plural program channels multiplexed in a transmission channel corresponding to each transponder of the communication satellite respectively, the TS packet of the program channel to be distributed to each CATV channel is read out from a corresponding packet selecting part to be multiplexed.

At this time, the read control part 65A transmits the read commands D66A to D66M synchronizing to the NIT/PAT/PMT data D56 repeatedly supplied from the CPU part 55, so that the transport streams D50A to D50M corresponding to each CATV channel are generated. At the same time, the corresponding NIT/PAT/PMT data for CATV D56 is added to each of the transport streams D50A to D50M, so that the NIT, PAT and PMT are written in each of the transport streams D50A to D50M according to the CATV channel structure.

In FIG. 4, the selected TS packet D32A transmitted from the packet selecting part 30A to the internal multiplex bus BUS forms the transport stream D50A in the above internal multiplex bus BUS, and it is supplied to the modulation part of the first CATV channel 70A via the read control part 65A. In the modulation part 70A, the transport stream D50A is subjected to 64QAM modulation, and it is transmitted to the head end part 80 shown in FIG. 2 as transmission signal S70A. Remultiplexing is then completed.

Also in the other CATV channels, similarly, selected TS packets D32B to D32M transmitted from the corresponding packet selecting parts 30B to 30M to the internal multiplex bus BUS form transport streams D50B to D50M in the above internal multiplex bus BUS, and they are supplied to the modulation parts of the second to the M-th CATV channels 70B to 70M via the read control parts 65B to 65M, respectively. In the modulation parts 70B to 70M, the transport streams D50B to D50M are subjected to 64QAM modulation respectively, and transmitted to the head end part 80 shown in FIG. 2 as transmission signals S70B to S70M. Remultiplexing is then completed.

Figure 6:
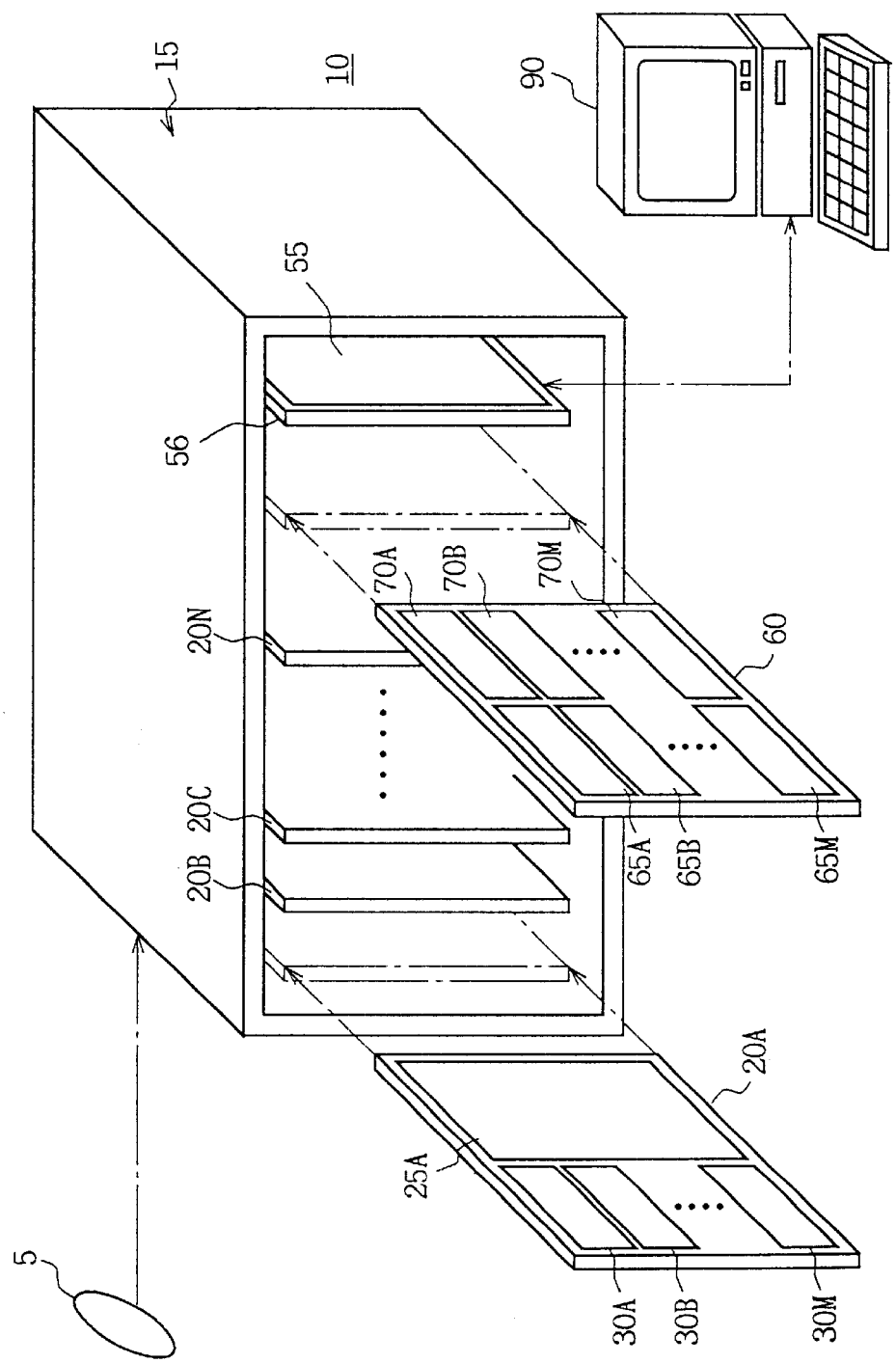
FIG. 6 is a perspective view showing the receiving distribution device according to the present invention.

As shown in FIG. 6, the housing 15 of the receiving distribution device 10 houses the following plural boards, the modulation board part 60, the CPU board part 56 and the N pieces of receiving board parts 20A to 20N in the same number of the transponders of the satellite. A personal computer (PC) 90 is connected to the CPU board part 56. The combination of channels in remultiplexing is changed by controlling the CPU part 55 by means of the above PC 90.

According to the above structure, the receiving distribution device 10 has the N pieces of receiving board parts 20A to 20N corresponding to the transponders of the communication satellite. Each of the receiving board parts 20A to 20N receives a digital multiplex satellite broadcasting wave from each corresponding transponder.

The digital multiplex satellite broadcasting wave fetched in each of the receiving board parts 20A to 20N is a transmission channel obtained by multiplexing plural different program channels. In the packet selecting parts 30A to 30M for M channels provided corresponding to the number of CATV channels, only the TS packet of the program channel to be distributed to each CATV channel is selected.

As the above, since a processing for passing only the TS packet to be distributed to the corresponding CATV channel is performed in each of the packet selecting parts 30A to 30M, the number of the above packet selecting parts 30A to 30M is limited to the number agree with the number of the CATV channels.

The selected TS packets selected in the packet selecting parts 30A to 30M of each of the receiving board parts 20A to 20N are transmitted to the corresponding internal multiplex bus BUS for each CATV channel. Thus, the selected TS packet of the program channel to be distributed to each CATV channel is extracted from each of the receiving board parts 20A to 20N, and collected for each CATV channel to be multiplexed.

According to the above structure, since the plural program channels multiplexed in each transmission channel relayed by the different transponders are collected for each CATV channel to be distributed respectively, the plural program channels relayed via the different transponders can be distributed to a single CATV channel.

Furthermore, since the number of the packet selecting parts 30A to 30M provided in each of the receiving board parts 20A to 20N may be prepared by the number of the CATV channels, the configuration can be simplified comparing with the case where a necessary program channel is selected after all program channels are temporary extracted.

The above embodiment has dealt with the case of having the N pieces of receiving board parts 20A to 20N, and the number is the same as the number of the transponders of a satellite. The present invention, however, is not only limited to this but more many receiving boards than the transponders of the satellite, for example, N+1 pieces of that may be provided. In this case, normally, N pieces of receiving board parts are used for active system, and remaining one receiving board part is not used in normal but as reserve system. If a failure is caused in the receiving board for active system, the CPU part 55 is controlled by the PC 90 shown in FIG. 6 to make the reserve system substitute a receiving processing to be performed by the receiving board having the above failure. Thereby, the redundancy of the receiving distribution device 10 is improved and a stop of CATV service accompanied with the failure of the receiving board part can be prevented.

Figure 7:
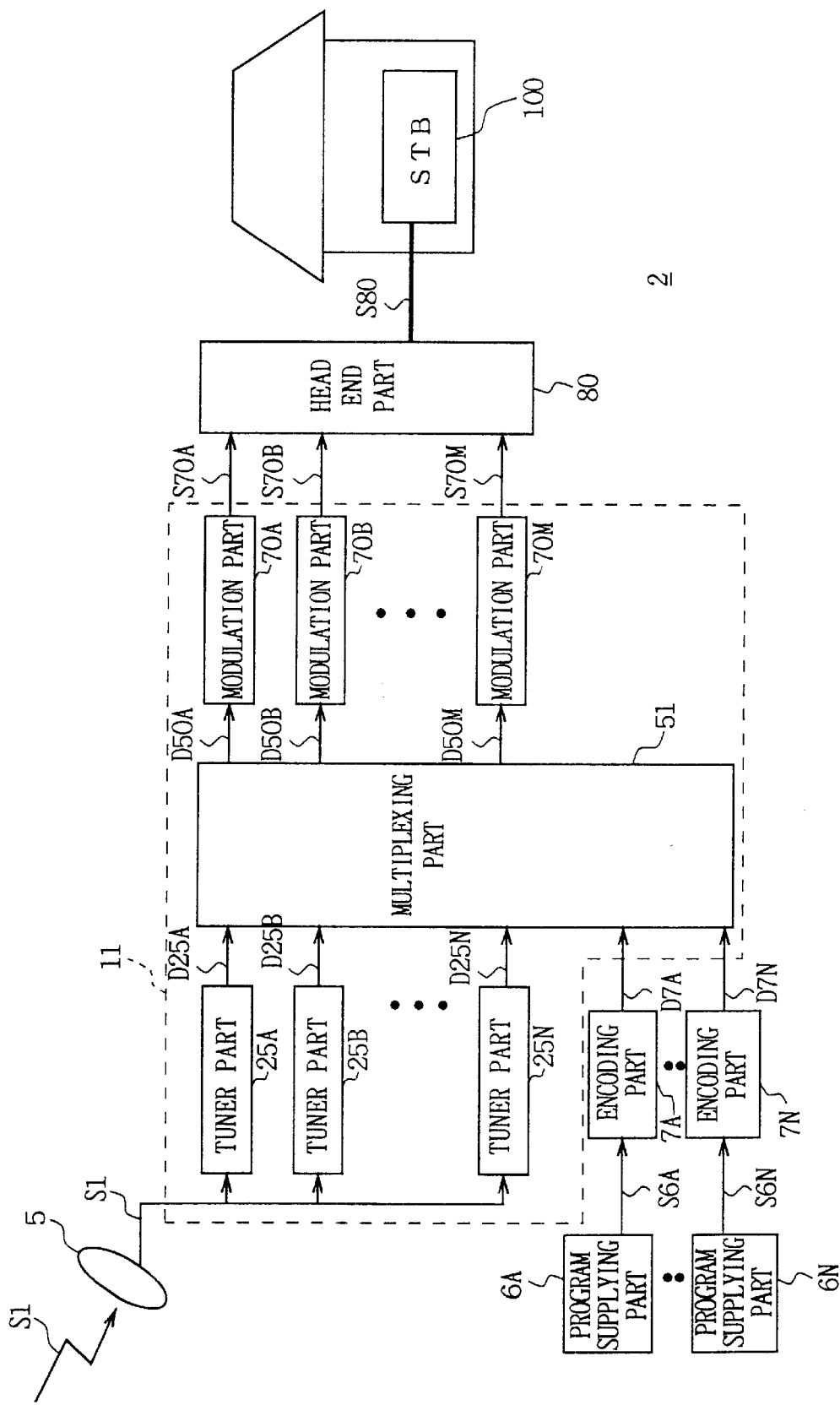
FIG. 7 is a block diagram showing a satellite broadcasting distribution CATV system according to another embodiment of the first and a second embodiments.

Furthermore, in the above embodiment, only the satellite signal S1 is supplied to the receiving distribution device 10. The present invention, however, is not only limited to this but also a video signal peculiar to CATV may be supplied to the receiving distribution device. Referring to FIG. 7 in which the same reference numerals are added to the same parts of FIG. 2, 2 generally shows a satellite broadcasting distribution CATV system. Video signals peculiar to CATV S6A to S6N which are supplied from program supplying parts 6A to 6N are compressively coded according to the MPEG2 system in encoding parts 7A to 7N. The coded signals are transmitted to a multiplexing part as peculiar program transport streams D7A to D7N.

Figure 8:
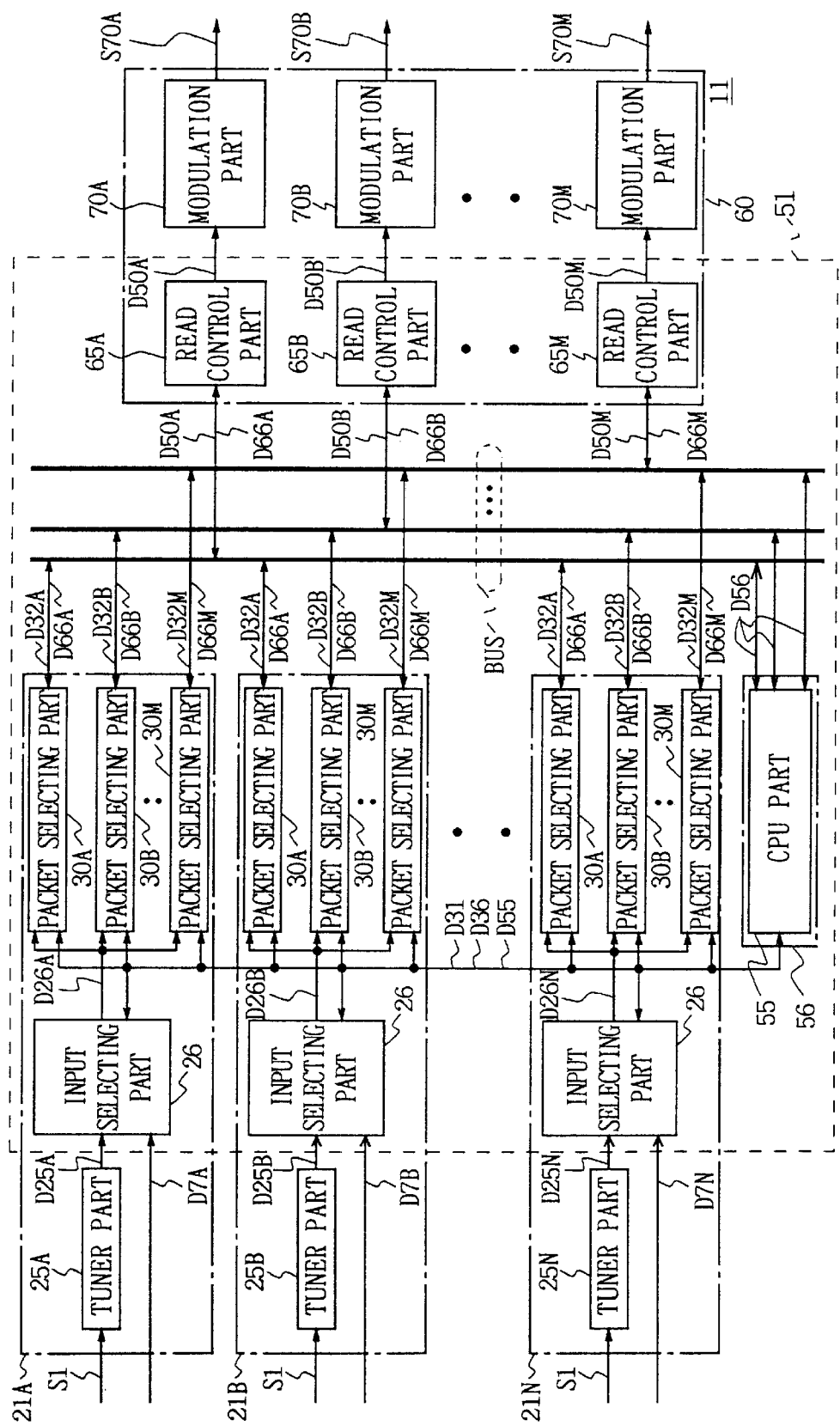
FIG. 8 is a block diagram showing a receiving distribution device according the other embodiment of the first and the second embodiments.

Referring to FIG. 8 in which the same reference numerals are added to the same parts of FIG. 4, 11 generally shows a partly detail of a receiving distribution device. N pieces of receiving boards 21A to 21N having the same configuration, the CPU part 55 and the modulation board 60 are connected to the bus BUS. The configuration of the receiving distribution device 11 is the same as the receiving distribution device 10 shown in FIG. 4 except for the configuration of the receiving boards 21A to 21N.

The peculiar program transport stream D7A transmitted to the multiplexing part is supplied to the input selecting part 26 of the receiving board 21A. Here, the transport stream D25A obtained by performing demodulation and error correction on the satellite signal S1 is simultaneously supplied from the tuner part 25A. The CPU part 55 transmits a selection signal D55 to the input selecting part 26 to select either of the peculiar program transport stream D7A by self-broadcasting of CATV or the transport stream D25A, and supplying this to the packet selecting parts 30A to 30M as a transport stream D26A. Thus, the receiving distribution device 11 can select between a satellite signal and a video signal peculiar to CATV before distribution.

Note that, here it has dealt with the case where all the N pieces of receiving boards had in the receiving distribution device 11 have the input selecting part 26. The present invention, however, is not only limited to this but only a part of the N pieces of receiving boards may have the input selecting part 26.

Furthermore, the above embodiment has dealt with the case of redistributing the digital multiplex broadcasting wave S1 to a CATV. The present invention, however, is not only limited to this but various broadcasting systems are applicable to the object of redistribution such as the case of redistributing the digital multiplex broadcasting wave S1 to other broadcasting systems as a terrestrial wave, or the like.

Moreover, the above embodiment has dealt with the case of broadcasting a program formed of video and audio. The present invention, however, is not only limited to this but various objects to be relayed, e.g., data communication, etc., can be applied.

Figure 1:
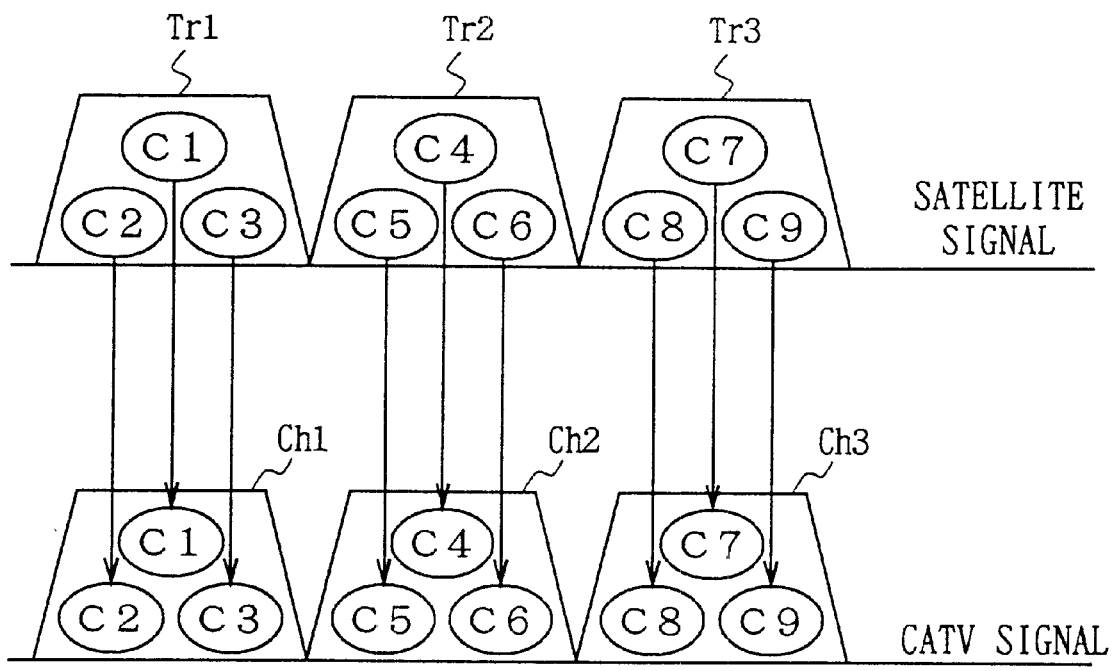
FIG. 1 is a schematic diagram showing the relationship between transponders and CATV channels.
Figure 9:
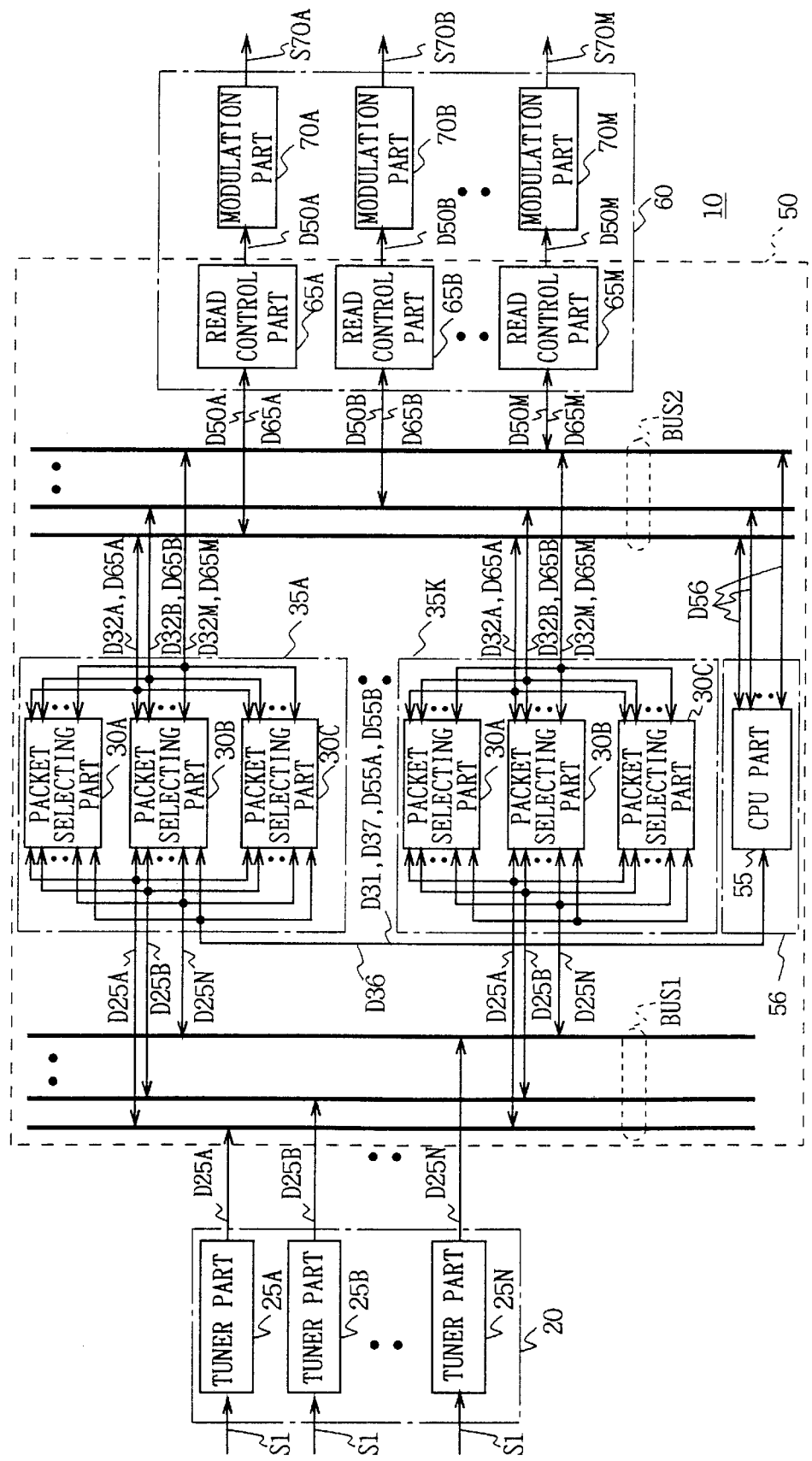
FIG. 9 is a block diagram showing a receiving distribution device according to the second embodiment.

(3) Configuration of Receiving Distribution Device of Second Embodiment FIG. 9 in which the same reference numerals are added to corresponding parts of FIGS. 2 and 4, 1 generally shows a partial detail of the receiving distribution device 10. In this device, a receiving board part 20 having the N pieces of tuner parts 25A to 25N of which the number is equal to the number of the transponders of a communication satellite, and plural packet selecting board parts 35A to 35K respectively having plural (three in the second embodiment) packet selecting parts 30A to 30C are connected by an internal multiplex bus BUS1. The number of the channels of the input multiplex bus BUS1 is equal to the number of the tuners 25A to 25N.

Each of the packet selecting board parts 35A to 35K is connected to the modulation board part 60 via an output multiplex bus BUS2. The number of the channels of the output multiplex bus BUS2 is equal to the number of the channels of a CATV (M pieces). The (M pieces of) read control parts 65A to 65M and the modulation parts 70A to 70M, by the number of the channels of the CATV, are provided in the modulation board part 60.

The corresponding channel of the input multiplex bus BUS1 receiving the transport stream D25A from the first tuner 25A of the receiving board part 20 supplies this to all the packet selecting parts 30A to 30C of all the packet selecting board parts 35A to 35K.

The corresponding channel of the input multiplex bus BUS1 receiving the transport stream D25B from the second tuner part 25B of the receiving board part 20 supplies this to all the packet selecting parts 30A to 30C of all the packet selecting board parts 35A to 35K.

In this manner, the transport streams D25A to D25N extracted in each of the N pieces of tuners 25A to 25N are supplied to all the packet selecting parts 30A to 30C of all the packet selecting board parts 35A to 35K via the corresponding channel of the input multiplex bus BUS1, respectively.

The total of the packet selecting parts 30A to 30C provided in each of the packet selecting board parts 35A to 35K has preset to be coincide with the number of program channels to be distributed to a CATV channel among the plural program channels multiplexed in each transmission channel of the digital multiplex satellite broadcasting wave (satellite broadcasting signal S1).

In this second embodiment, as described referring to FIG. 3, the six program channels C2, C3, C5, C6, C8 and C9 are selected from among the nine program channels C1 to C9, and these are distributed by sharing between the two CATV channels Ch1 and Ch2. Therefore, the total of the packet selecting parts 30A to 30C has been set to six corresponding to the number of the six program channels to be distributed to the CATV channels.

Figure 10:
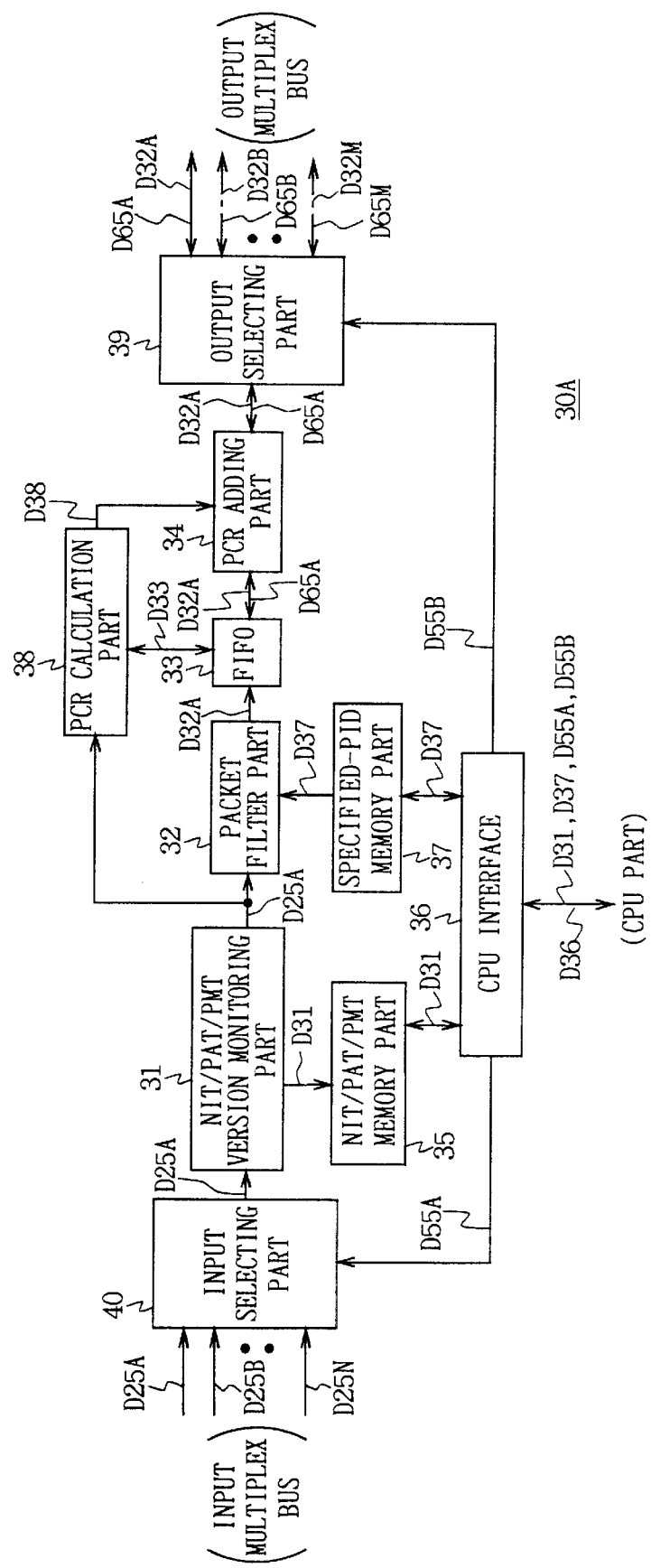
FIG. 10 is a block diagram showing a packet selecting part according to the second embodiment.

FIG. 10 shows the first packet selecting part 30A provided in the first packet selecting board part 35A. The transport streams D25A to D25N supplied from each of the tuners 25A to 25N (FIG. 9) are inputted to an input selecting part 40. This input selecting part 40 selects the transport stream D25A that includes the program channel to be selected in the above packet selecting part 30A among the plural program channels to be distributed to the CATV channel.

In this case, the program channel to be selected in the above packet selecting part 30A has preset in the CPU part 55 (FIG. 9). The CPU part 55 selects the transport stream D25A of the transmission channel in which the above program channel to be selected in the packet selecting part 30A has multiplexed by selection information D55A, and supplies thus selected transport stream D25A to the subsequent NIT (network information table)/PAT (program association table)/PMT (program map table) version monitoring part 31.

The CPU part 55 (FIG. 9) presets the correspondence between program channels to be distributed to each CATV channel and a packet selecting part for selecting the above program channels. For example, with respect to the first program channel C2 to be distributed to the first CATV channel (FIG. 3), the CPU part 55 reads the position of the TS packet of the program channel to be distributed to the first CATV channel (i.e., the PID of the above TS packet) from the NIT/PAT/PMT memory part 35 of the packet selecting part 30A shown in FIG. 10, that is corresponding to the first program channel C2, and storing this in the specified-PID memory part 37 as the PID information D37.

The packet filter 32 fetches only the TS packet specified by the PID information D37 from the incoming transport stream D25A, and transmitting this to a following FIFO (first in, first out) buffer 33. Thus, only the TS packet of the program channel to be distributed to the first CATV channel is supplied to the above FIFO buffer 33 from the transport stream D25A selected in the input selecting part 40.

In this connection, also in the second embodiment, in the transport stream D25A, the same information is always repeatedly assigned as the NIT, PAT and PMT. As the case where the contents of broadcasting of the digital multiplex satellite broadcasting is changed, however, if the combination of a transponder and a program channel is changed, also information on the above NIT, PAT and PMT are updated. Here, since the NIT, PAT and PMT have version information, the version information is simultaneously updated if the contents of broadcasting is changed. Thus, the CPU interface 36 can detect the update of the above NIT, PAT and PMT by monitoring the version information of the NIT, PAT and PMT.

In the satellite broadcasting distribution CATV system 1 for redistributing a digital multiplex satellite broadcasting to a CATV, the NIT/PAT/PMT version monitoring part 31 shown in FIG. 10 always monitors the NIT, PAT and PMT assigned to the transport stream D25A. And if the update of the version of the NIT, PAT and PMT is detected, the above new NIT, PAT and PMT are sequentially stored for update in the NIT/PAT/PMT memory part 35 as the NIT/PAT/PMT data D31. Therefore, the latest NIT, PAT and PMT are always stored in the NIT/PAT/PMT memory part 35.

The CPU interface 36 always monitors the NIT/PAT/PMT memory part 35. If the update of the version of the NIT, PAT and PMT is detected, this means that the assignment of the program channels of the digital multiplex satellite broadcasting or the like is changed, so that the above CPU interface 36 transmits the version update information D36 to the CPU part 55 (FIG. 9). If receiving the version update information D36, the CPU part 55 reads the latest NIT/PAT/PMT data D31 from the NIT/PAT/PMT memory part 35, generates the NIT/PAT/PMT data for CATV D56 (FIG. 9) corresponding to the CATV channel structure, based on the above NIT/PAT/PMT data D31, and repeatedly transmits this to the output multiplex bus BUS2 (FIG. 9).

Thus, the NIT/PAT/PMT data for CATV D56 (FIG. 9) can be obtained to always distribute a predetermined program channel to a CATV channel even if the program channel structure of the digital multiplex satellite broadcasting is modified.

In this connection, if the transmission channel in which the above program channel has multiplexed is changed (that is, if the transponder is changed) in the case where the program channel structure of the digital multiplex satellite broadcasting has modified, the CPU interface 36 distinguishes the above new transmission channel (transponder) from the latest NIT stored in the NIT/PAT/PMT memory part 35, and switches the input selecting part 40 corresponding to the changed new transponder. Therefore, the outputs of the tuner parts 25A to 25N for receiving a satellite broadcasting wave from the new transponder (transport stream) can be selected in the input selecting part 40.

The CPU part 55 (FIG. 9) has been store CATV channels being the destination of distribution of the program channel selected in the packet selecting part 30A of the packet selecting board part 35A shown in FIG. 10, and transmits a selection command D55B to an output selecting part 39 via the CPU interface 36 corresponding to that.

In this embodiment, the program channel C2 (FIG. 3) selected in the packet selecting part 30A of the packet selecting board part 35A (FIG. 10) has been set to be distributed to the first CATV channel. Thus, the CPU part 55 (FIG. 9) selects an output by the output selecting part 39 so that the first CATV channel is set to be distributed. As a result, the read control part of the first CATV channel 65A (FIG. 9) is connected to the first packet selecting part 30A of the packet selecting board part 35A via the corresponding channel of the output multiplex bus BUS2.

Thereby, the FIFO buffer 33 reads the selected TS packet D32A written in the above FIFO buffer 33 according to a read command D65A that is supplied from the read control part 65A via the output multiplex bus BUS2, and transmitting this to the bus BUS via the program clock reference (PCR) adding part 34.

In this manner, the packet selecting part 30A of the packet selecting board part 35A (FIGS. 9 and 10) which has been set to select the first program channel C2 (FIG. 3) among the plural program channels multiplexed in the digital multiplex satellite broadcasting selectively inputs the transport stream D25A from the first transponder of the communication satellite for relaying the transmission channel in which the above program channel C2 has multiplexed, and selectively outputs the above program channel C2 to the corresponding channel of the output multiplex bus BUS2 connected to the first CATV channel to be its destination of distribution.

Also in the other packet selecting parts 30B and 30C provided in the above packet selecting board part 35A and the packet selecting parts 30A to 30C provided in the other packet selecting board part 35K, similarly, a program channel to be selected is selected respectively, and the above selected program channel is selectively outputted to the corresponding channel of the output multiplex bus BUS2 connected to the CATV channel to be its destination of distribution.

The output multiplex bus BUS2 has plural channels corresponding to each CATV channel. For example, the selected TS packet from the packet selecting part which has been set to select the program channels C2, C5 and C6 (FIG. 3) to be distributed to the above CATV channel is supplied to the channel of the output multiplex bus BUS2 corresponding to the first CATV channel Ch1 (FIG. 3), for example.

And the selected TS packet from the packet selecting part which has been set to select the program channels C3, C8 and C9 (FIG. 3) to be distributed to the above CATV channel is supplied to the channel of the output multiplex bus BUS2 corresponding to the second CATV channel Ch2 (FIG. 3).

As the above, each TS packet of the plural program channels to be distributed to each CATV channel separated from each transmission channel (selected TS packet) is assigned to the corresponding CATV channel of the output multiplex bus BUS2.

In FIG. 9, the modulation board part 60 has the M pieces of read control parts 65A to 65M corresponding to the CATV channels. The above read control parts 65A to 65M respectively always monitor the FIFO buffer 33 (FIG. 10) provided in each of the packet selecting parts 30A to 30C of the corresponding packet selecting board parts 35A to 35K via the output multiplex bus BUS2. Then, the read control parts 65A to 65M transmit the read commands A D65A to D65M to each of the above FIFO buffers 33 based on the occupied amount of the selected TS packet in the FIFO buffer 33 in a prescribed order, respectively. The selected TS packet in the FIFO buffer 33 is sequentially read out to the output multiplex bus BUS2 to be multiplexed in each CATV channel.

As the above, in the plural program channels multiplexed in the first transmission channel relayed by the first transponder of the communication satellite, the TS packet of the program channel C2 (FIG. 3) to be distributed to the first CATV channel is selected by the first packet selecting part 30A of the first packet selecting board part 35A, and distributed to the above first CATV channel by the read control part of the first CATV channel 65A.

In the plural program channels multiplexed in the second transmission channel, the TS packet of the program channel C5 (FIG. 3) to be distributed to the first CATV channel is selected by the packet selecting part corresponding to this, and distributed to the above first CATV channel by the read control part of the first CATV channel 65A.

In the plural program channels multiplexed in each transmission channel, the TS packet of the program channel to be distributed to the first CATV channel is selected by the corresponding packet selecting part provided in one of the packet selecting board parts 35A to 35K, read out by the read control part of the first CATV channel 65A, and multiplexed for CATV distribution.

Also in the second to the M-th CATV channels, similarly, in the plural program channels respectively multiplexed in a transmission channel corresponding to each transponder of the communication satellite, the TS packet of the program channel to be distributed to each CATV channel is read out from a corresponding packet selecting part to be multiplexed.

At this time, the read control part 65A transmits the read commands D65A to D65M synchronizing to the NIT/PAT/PMT data D56 repeatedly supplied from the CPU part 55 (FIG. 9), so that the transport streams D50A to D50M corresponding to each CATV channel are generated. At the same time, the corresponding NIT/PAT/PMT data for CATV D56 is added to each of the transport streams D50A to D50M, so that the NIT, PAT and PMT are written in each of the transport streams D50A to D50M according to the CATV channel structure.

In this manner, the selected TS packet of the program channel to be distributed to each CATV channel is transmitted from the corresponding packet selecting part to the output multiplex bus BUS2, and multiplexed in the above output multiplex bus BUS2 for each CATV channel. The selected TS packet of the program channel to be distributed to the first CATV channel forms the transport stream D50A in the above output multiplex bus BUS2, and it is supplied to the modulation part 70A of the first CATV channel via the read control part 65A. In the modulation part 70A, the transport stream D50A is subjected to 64QAM modulation, and then it is transmitted to the head end part 80 shown in FIG. 2 as the transmission signal S70A. Remultiplexing is then completed.

Also in the other CATV channels, similarly, the selected TS packets transmitted from the corresponding packet selecting parts to the output multiplex bus BUS2 are multiplexed in each CATV channel and forming the transport streams D50B to D50M respectively. They are supplied to the modulation parts 70B to 70M of the second to the M-th CATV channels via the read control parts 65B to 65M, respectively. In the modulation parts 70B to 70M, the transport streams D50B to D50M are subjected to 64QAM modulation respectively, and then they are transmitted to the head end part 80 shown in FIG. 2 as the transmission signals S70B to S70M. Remultiplexing is then completed.

Figure 11:
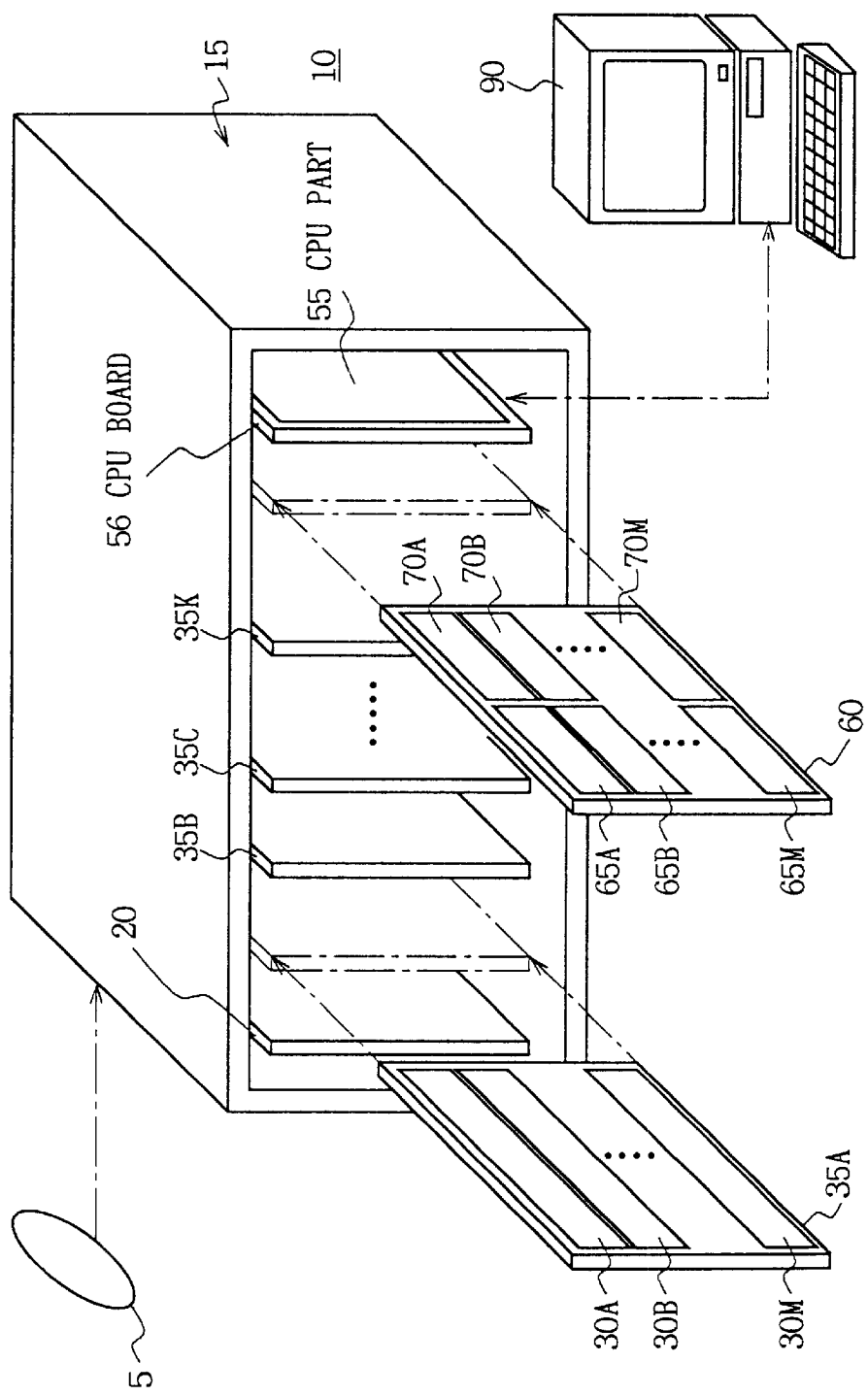
FIG. 11 is a perspective view showing a receiving distribution device according to the second embodiment.

As shown in FIG. 11, the housing 15 of the receiving distribution device 10 houses the following plural boards, the receiving board part 20, modulation board part 60, CPU board part 56 and packet selecting board parts 35A to 35K. Each of the packet selecting board parts 35A to 35K has a prescribed number (three in the second embodiment) of the packet selecting parts 30A to 30C, and the number of the packet selecting board parts 35A to 35K is determined so that the total of the above packet selecting parts agrees with the total of program channels to be distributed to a CATV channel.

The personal computer (PC) 90 is connected to the CPU board part 56. The combination of channels in remultiplexing is changed by controlling the CPU part 55 by means of the above PC 90.

According to the above construction, the receiving distribution device 10 has the packet selecting parts 30A to 30C of which the number is corresponding to program channels to be distributed to a CATV among plural program channels multiplexed in a digital multiplex satellite broadcasting. The input multiplex bus BUS1 is provided on the input side of each of the packet selecting parts 30A to 30C, and the transport stream of each transmission channel received via the plural tuners 25A to 25N provided in the receiving board part 20 can be inputted to all the packet selecting parts 30A to 30C via the input multiplex bus BUS1.

Program channels to be selected in the packet selecting parts 30A to 30C have been set in the CPU part 55. The above CPU part 55 controls to switch each input selecting part provided in the input stage of the packet selecting parts 30A to 30C, so that a program channel to be distributed to the CATV is assigned to each of the packet selecting parts 30A to 30C without their duplication.

In this manner, the transport stream of a transmission channel in which target program channels have multiplexed is inputted to each of the packet selecting parts 30A to 30C corresponding to each program channel to be distributed to the CATV. Each of the packet selecting parts 30A to 30C selects the TS packet of the target program channel from the inputted transport stream, and distributes this to the corresponding CATV channel.

By performing a processing for passing only the TS packet of the corresponding program channel in the packet selecting parts 30A to 30C made to correspond to the program channel to be distributed to the CATV, the number of the above packet selecting parts 30A to 30C is limited to the number of the program channels to be distributed to the CATV.

In this case, different program channels to be distributed to the same CATV channel are multiplexed and collected by the output multiplex bus BUS2 provided on the output side of each of the packet selecting parts 30A to 30C.

According to the above construction, the plural program channels relayed by different transponders and multiplexed in each transmission channel are collected into a CATV channel to be distributed respectively, so that the plural program channels relayed via the different transponders can be distributed to the single CATV channel.

Furthermore, since the number of the packet selecting parts 30A to 30C may be prepared by the number of the program channels to be distributed to the CATV, the configuration can be simplified comparing with the case of selecting only a necessary program channel after the TS packets of all the program channels are temporary extracted.

Moreover, the packet selecting board parts 35A to 35C having the packet selecting parts 30A to 30C are freely detachable. Therefore, in the case where the number of program channels to be distributed to a CATV is increased, a new packet board part may be attached and registering this in the CPU part 55. Thereby, the number of program channels can be changed easily.

In the above second embodiment, only the satellite signal S1 is supplied to the receiving distribution device 10. The present invention, however, is not only limited to this but also a video signal peculiar to CATV may be supplied to the receiving distribution device. Referring to FIG. 7 in which the same reference numerals are added to the same parts of FIG. 2, 2 generally shows the satellite broadcasting distribution CATV system. The video signals peculiar to CATV S6A to S6N supplied from the program supplying parts 6A to 6N are compressively coded by the MPEG2 system in the encoding parts 7A to 7N, and then they are transmitted to a multiplexing part as the peculiar program transport streams D7A to D7N.

Figure 12:
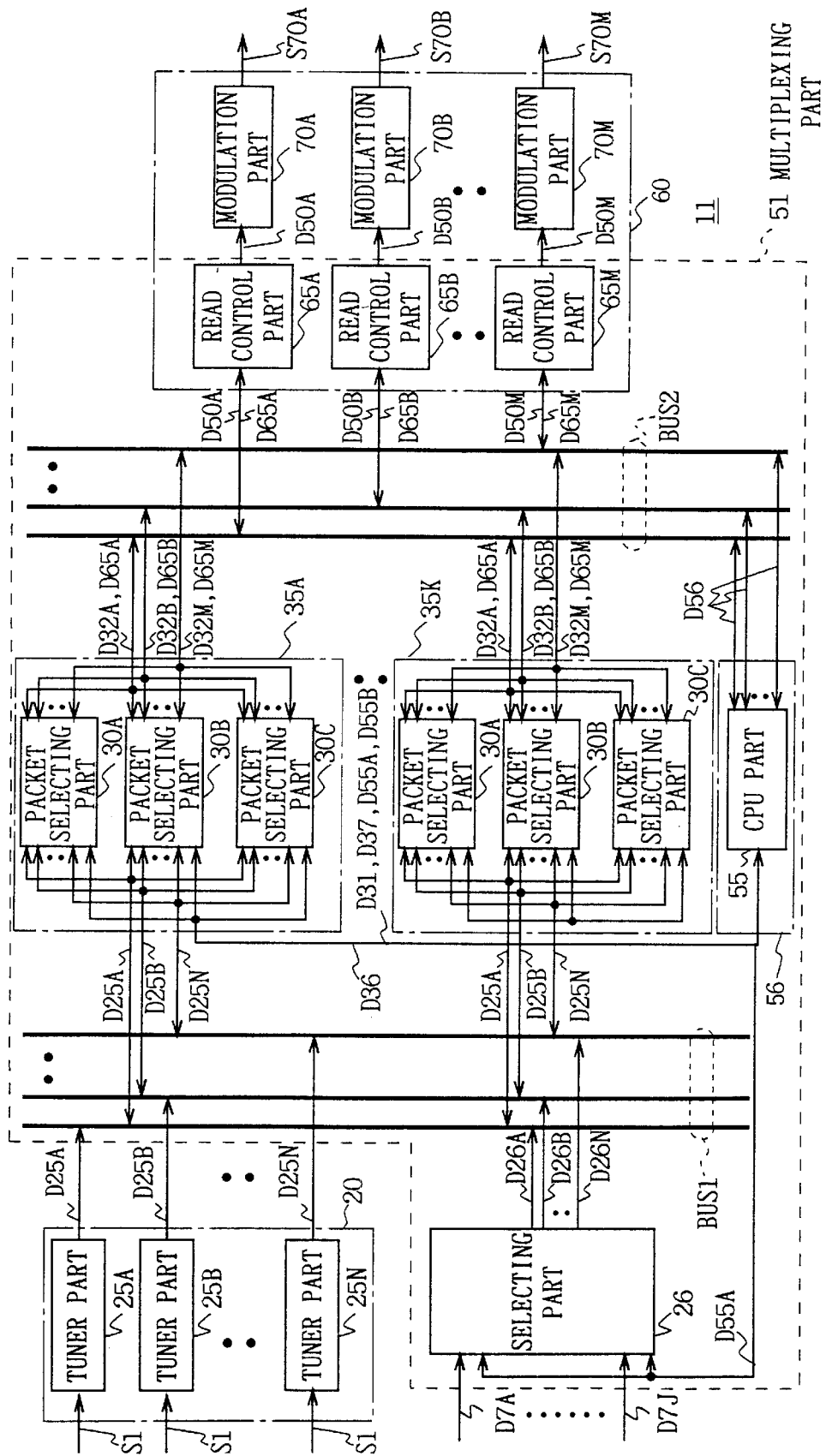
FIG. 12 is a block diagram showing a receiving distribution device according to a third embodiment.

Referring to FIG. 12 in which the same reference numerals are added to the same parts of FIG. 9, 11 generally shows a receiving distribution device according to a third embodiment. J pieces of selecting parts 21A to 21J having the same configuration (not shown) are connected to the input multiplex bus BUS1. The configuration of the other parts is the same as the receiving distribution device 10 shown in FIG. 9.

The peculiar program transport streams D7A to D7J transmitted to a multiplexing part 51 are supplied to a selecting part 26. Here, the selection signal D55A has supplied to the selecting part 26 from the CPU part 55. The above selecting part 26 supplies the transport streams D7A to D7J to the packet selecting board parts 35A to 35K via the input multiplex bus BUS1 as one of the transport streams D26A to D26J. Thereby, the receiving distribution device 11 can distribute a satellite signal and a video signal peculiar to CATV.

In this connection, the selecting part 26 provided at the input side of the input multiplex bus BUS1 in FIG. 12 may be omitted. In this case, the transport streams peculiar to CATV D7A to D7J may be directly inputted to the input multiplex bus BUS1.

The above second embodiment has dealt with the case of using the input multiplex bus BUS1 as the assignment means for assigning each of the transport streams D25A to D25N received in the tuner parts 25A to 25N to each of the packet selecting parts 30A to 30C. The present invention, however, is not only limited to this but also other various switch circuits or the like may be used.

The above second embodiment has dealt with the case where the three packet selecting parts 30A to 30C are provided in each of the packet selecting board parts 35A to 35K. The present invention, however, is not only limited to this but various number of packet selecting parts can be applied, for example, providing four packet selecting parts.

Furthermore, the above second embodiment has dealt with the case of redistributing the digital multiplex broadcasting wave S1 to a CATV. The third embodiment, however, is not only limited to this but various broadcasting systems are applicable to the object of redistribution such as the case of redistibuting the digital multiplex broadcasting wave S1 to other broadcasting systems as a terrestrial wave, or the like.

Moreover, the above second embodiment has dealt with the case of broadcasting a program formed of video and audio. The present invention, however, is not only limited to this but various objects to be relayed, e.g., data communication, etc., can be applied.

In an information repeater system for receiving a broadcasting wave formed by multiplexing plural broadcastings and distributing this to the corresponding channel of a specified broadcasting system, a data stream relayed by specified transponders is extracted from the broadcasting wave, arbitrary packets are specified and extracted from the above data stream, and the above extracted packets are transmitted to the specified channel of the specified broadcasting system. Thereby, a desired channel can be extracted and transmitted to the desired channel of the specified broadcasting system from among the plural broadcastings multiplexed in the broadcasting wave.

In an information repeater system for receiving a broadcasting wave formed by multiplexing plural broadcastings and distributing this to the corresponding channel of a specified broadcasting system, a data stream relayed by specified transponders is extracted from the broadcasting wave, the above extracted data stream is assigned to a specified packet extracting means, arbitrary packets are specified and extracted from the data stream in the above packet extracting means, and the above extracted packets are transmitted to the specified channel of the specified broadcasting system. Thereby, a desired channel can be extracted and transmitted to the desired channel of the specified broadcasting system from among the plural broadcastings multiplexed in the broadcasting wave.

Since a single packet extracting means is made to correspond to each broadcasting program to be distributed to the specified broadcasting system, the number of the above packet extracting means can be limited to the number of broadcastings to be distributed, and thus, the configuration of the information repeater system can be simplified.

Furthermore, the information repeater system includes a system information update detecting means for detecting whether or not the content to make corresponding a desired program channel and a packet corresponding to the above desired program channel. If that the contents of the above system information in the broadcasting wave has updated is detected by the above update detecting means, the system information stored in the above system information storing means is rewritten into a new system information for update. Thereby, the broadcasting can be redistributed to the specified broadcasting system even if the system information has updated.

Moreover, clock reference information transmitted from the broadcasting wave is extracted to correct a temporal difference for redistribution, and it is redistributed to the specified broadcasting system. Thereby, accurate clock reference information can be obtained in the specified broadcasting system.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An information repeater system for receiving N (N is an integer greater than 1) broadcast waves transmitted from plural transponders each broadcast wave being formed of multiplexed broadcast channels with each channel comprising transport stream packets; said system comprising:
   receiving means for receiving said N broadcast waves and for extracting said broadcast channels therefrom;
   packet extracting means for extracting selected packets from the transport stream packets in each channel;
   remultiplexing means for remultiplexing combinations of said extracted packets from different transponders to form M remultiplexed channels of transport stream packets, where M is an integer greater than 1; and
   transmission means for transmitting respective ones of said M remultiplexed channels to predetermined ones of M output channels.

2. The information repeater system according to claim 1, wherein said N broadcast waves are received from N broadcast wave transponders, respectively.

3. The information repeater system according to claim 1, wherein said receiving means comprises a plurality of receivers for receiving and extracting respective channels from N different broadcast waves; and said packet extracting means comprises a plurality of packet extractors for extracting a specified packet in each channel extracted by each of said receivers.

4. The information repeater system according to claim 1, wherein M packet extractors are provided for each of said receivers.

5. The information repeater system according to claim 1, further including:
   input means for receiving a data stream from an independent broadcasting source; and output selecting means for outputting either said broadcast channels received from a respective transponder or said data stream received from the independent broadcasting source.

6. The information repeater system according to claim 5, further including encoding means for encoding the data stream received from the independent broadcasting source and supplying the encoded data stream to said output selecting means.

7. The information repeater system according to claim 1, wherein at least one of said M output channels in supplied to a cable broadcasting system.

8. The information repeater system according to claim 3, wherein said plural packet extractors correspond to those respective signals that are transmitted to a respective output channel.

9. The information repeater system according to claim 1, wherein a broadcast wave includes system information to identify a desired program channel and to identify a packet corresponding to said desired program channel; and wherein said packet extracting means includes storing means for storing said system information, and for extracting said selected packets based on said stored system information.

10. The information repeater system according to claim 9, wherein said packet extracting means includes update detection means for detecting whether said system information has been updated and for rewriting the system information stored in said storing means with updated system information.

11. The information repeater system according to claim 1, wherein a broadcast wave includes clock reference information; and said packet extracting means comprises extracting means for extracting said clock reference information, buffer means for storing said extracted packet and having a storing state, correcting means for correcting said extracted clock reference information based on the storing state of said buffer means, and adding means for adding said corrected clock reference information to a selected packet outputted from said buffer means.

12. A method for relaying information from N received broadcast waves, where N is an integer greater than 1, and the N broadcast waves are transmitted from plural transponders, with each broadcast wave being formed of multiplexed broadcast channels, with each channel comprising transport stream packets, said method comprising the steps of:
   receiving said N broadcast waves and extracting said broadcast channels therefrom;
   extracting selected packets from the transport stream packets in each channel;
   remultiplexing combinations of said extracted packets from different transponders to form M remultiplexed channels of transport stream packets, where M is an integer greater than 1; and
   transmitting respective ones of said M remultiplexed channels to predetermined ones of M output channels.

13. The method according to claim 12, wherein said N broadcast waves are received from N broadcast wave transponders, respectively.

14. The method according to claim 12, wherein respective channels are extracted from N different broadcast waves; and a specified packet in each channel is extracted.

15. The method according to claim 12, further-including the steps of receiving a data stream from an independent broadcasting source; and outputting either said broadcast channels received from a respective transponder or the data stream received from the independent broadcasting source.

16. The method according to claim 15, wherein the data stream received from the independent broadcasting source is encoded.

17. The method according to claim 12, wherein a broadcast wave includes system information to identify a desired program channel and to identify a packet corresponding to said desired program channel; and wherein said system information is stored, and the extraction of said selected packets is based on said stored system information.

18. The method according to claim 17, further including the steps of; detecting whether said system information has been updated; and rewriting the stored system information with updated system information.

19. The method for relaying information according to claim 12, wherein a broadcast wave includes clock reference information; and said selected packets are extracted by extracting said clock reference information, storing said extracted packets in a buffer, correcting said extracted clock reference information based on the state of the buffer, and adding said corrected clock reference information to a selected packet outputted from said buffer.

* * * * *